March 21, 1939. W. C. CAVANAGH 2,151,264
METHOD OF CLEANING OUT SLAG OR CINDER POCKETS
OF OPEN HEARTH HEATING FURNACES
Filed Oct. 5, 1937 2 Sheets-Sheet 1
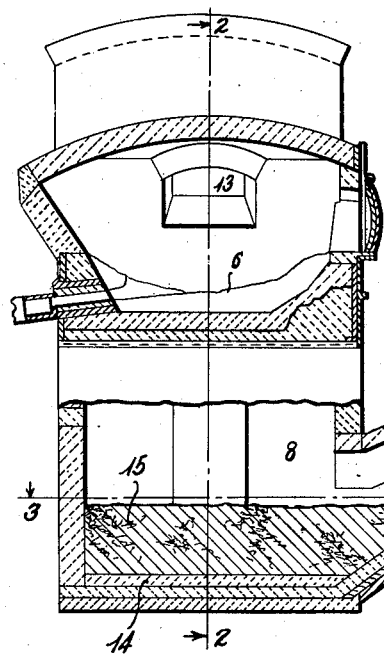
Fig.1
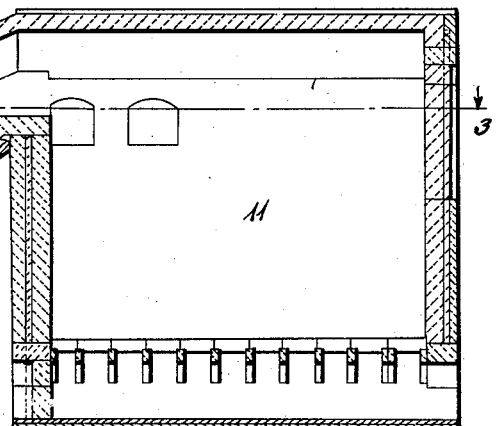
Fig.2
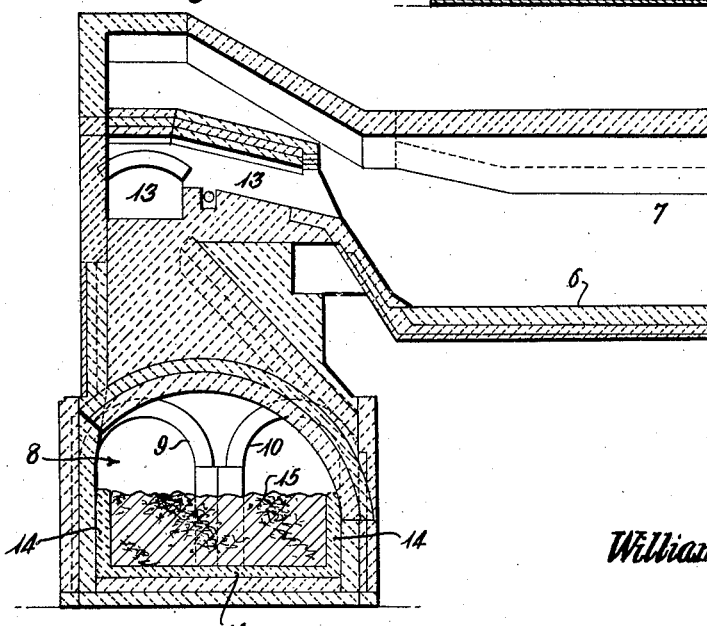
Inventor
William C. Cavanagh
By L. Donald Myers
Attorney

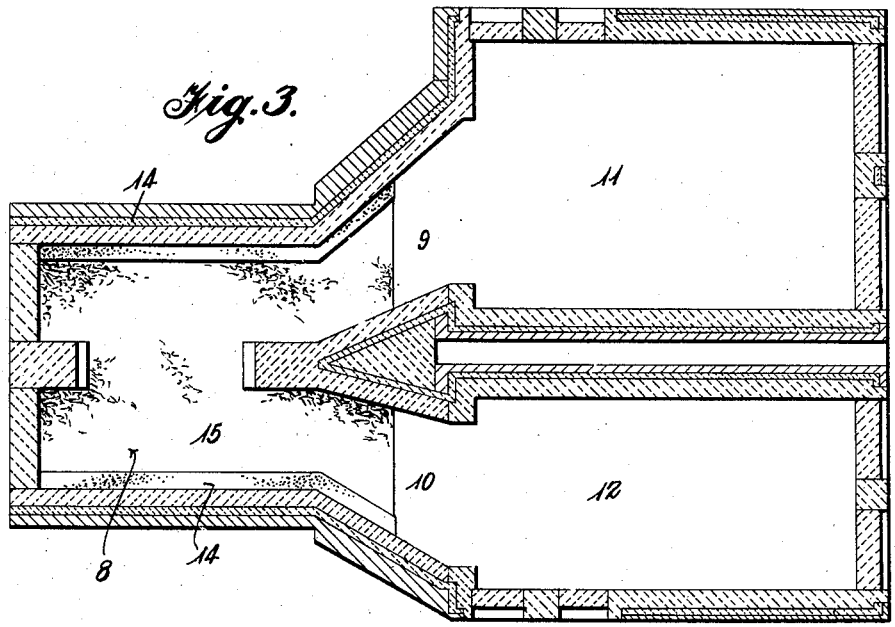
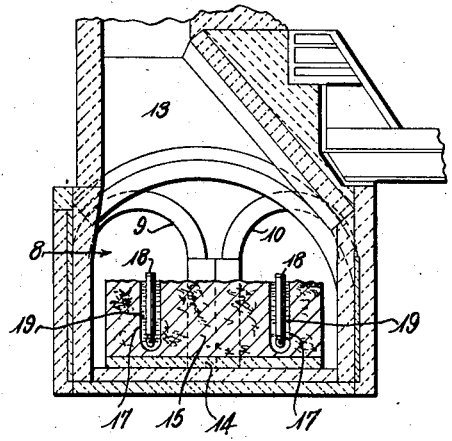 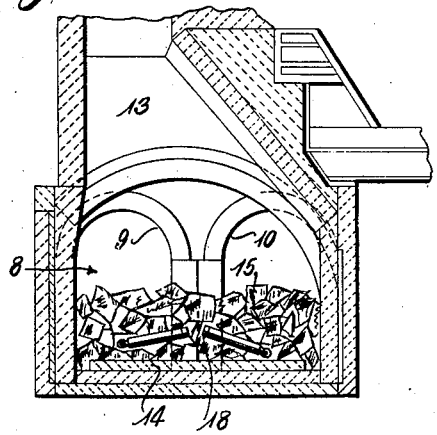
Inventor
William C. Cavanagh
By L. Donald Myers
Attorney Patented Mar. 21, 1939

2,151,264

UNITED STATES PATENT OFFICE 2,151,264

METHOD OF CLEANING OUT SLAG OR CINDER POCKETS OF OPEN HEARTH HEATING FURNACES

William Curran Cavanagh, Washington, Pa., assignor to Cardox Corporation, a corporation of Illinois Application October 5, 1937, Serial No. 167,436

21 Claims. (Cl. 263—52)

This invention relates to new and useful improvements in methods of cleaning out slag or cinder pockets of open hearth heating furnaces.

In the operation of open hearth heating furnaces, it is the customary practice to extract heat from the products of combustion, leaving the combustion chamber of the melting hearth to preheat the air or air and gas, employed for supporting combustion in said chamber. The structures and methods employed for effecting this heat exchange naturally vary in different types and makes of furnaces. However, it is customary in all such furnaces to pass the hot gases through one or more slag or cinder pockets between the time they leave the combustion chamber and enter the heat exchange structure. While passing through the slag or cinder pockets, the hot gases are permitted to expand which causes molten material, such as slag and cinders, oxidized from the melting material in the hearth to be precipitated into the pockets. Operation of the furnace may be continued until slag accumulates in the pockets to such a level that the pockets will no longer perform their intended function. The furnace then must be shut down to permit the pockets to be cleaned out.

To accomplish this cleaning out operation, it is necessary to remove a door or a portion of one of the brick walls of each pocket to gain access to the slag precipitated therein. As the slag is, for the most part, a molten mass when the furnace is first shut down, water is sprayed into the pockets to lower the temperature as quickly as possible. As soon as the temperature will permit, workmen in insulated clothing enter the pockets and commence the difficult task of removing the slag.

The method now commonly employed to remove the slag, which has solidified by the time the temperature in the pockets is lowered to a point where workmen can enter the same, is to employ pneumatic picks, sledges, and the like, to break up the slag into chunks of a size which can be handled readily. With this method, it requires from sixty to eighty hours to clean out the slag or cinder pockets of a furnace.

It is the primary object of this invention to provide an improved method of cleaning out the deposits in slag or cinder pockets in open hearth furnaces more quickly and easily than with the method now commonly employed, thereby materially increasing the total number of production hours and decreasing the labor cost for each furnace.

Other objects and advantages of the invention will be apparent during the course of the following description.

In the accompanying drawings forming a part of this specification, and in which like numerals are employed to designate like parts throughout the same, Figure 1 is a vertical sectional view taken through the hearth, the slag or cinder pockets and the checker chamber of a conventional form of open hearth heating furnace, Figure 2 is a vertical sectional view taken on line 2—2 of Fig. 1, Figure 3 is a horizontal sectional view taken on line 3—3 of Fig. 1, Figure 4 is a fragmentary vertical sectional view through a slag or cinder pocket with the deposited slag prepared for being broken up in accordance with the method embodying this invention, and Figure 5 is a similar view to Fig. 4, but illustrates the slag after it has been broken up in readiness for easy and quick removal from the cinder pockets.

In the drawings, wherein for the purpose of illustration are shown the steps of the method embodying this invention, when the method accomplishes the removal of slag deposited in the cinder pockets of a conventional form of open hearth furnace of the producer gas type. This furnace structure is shown by way of illustration only, and it is not intended to in any way limit the invention to this or any other type of furnace structure because of this selection. The furnace structure shown includes a melting hearth 6 conventionally positioned within the combustion chamber 7. At each end of the hearth and combustion chamber, there is located a cinder pocket 8 of a construction peculiar to this type of furnace. This cinder pocket communicates through passageways 9 and 10 with an air checker chamber 11 and a gas checker chamber 12, respectively. The cinder pocket 8 also communicates with the melting hearth 6 and combustion chamber 7 through the series of passages 13 suitably angularly arranged and connected in series to form a suitable flow path. The several figures only illustrate the checker chambers and slag or cinder pockets located at one end of the furnace structure. It is to be understood that the same arrangement and combination of elements is provided at the remaining end of the furnace structure. It is to be understood that the checker chambers 11 and 12 are provided with the desired arrangement of brick work to permit each chamber to perform its intended work in the conventional manner. In furnaces burning tar or oil, the gas checker chamber 12 and its passageway 10 are not employed. A suitable burner is located in each end of the combustion chamber, adjacent the discharge opening of the flow path formed by the passageways 13 so that the air discharged into the combustion chamber adjacent the burner will support combustion of the fuel fed through the burner.

In the producer gas type of heating furnace illustrated in the drawings, the hot products of combustion, or waste gases, leave the combustion chamber by flowing through the passageways 13 from which they enter the slag or cinder pocket 8 at one end of the furnace. From the cinder pocket, the hot products of combustion flow through the passages 9 and 10 into the air and gas checker chambers 11 and 12, respectively. From the chambers 11 and 12, the hot gases are discharged to a stack, not shown, in the conventional manner. While passing through the checker chambers, the hot gases thoroughly heat the brick work arranged therein. While the hot products of combustion are passing through the slag or cinder pocket 8, these hot gases are permitted to expand with the result that the slag or cinder particles are permitted to precipitate from the hot gases to be deposited in the pocket.

Concurrently at the remaining end of the furnace, air and gas are caused to flow through the checker chambers 11 and 12, respectively, into the cinder pocket 8 and through the passageways 13 into the combustion chamber 7 where the combined air and gas is ignited and burned to effect heating of the material in the hearth 6. The incoming air and gas, during their passage through the checker chambers 11 and 12, respectively, are heated to a proper temperature by the heat retained in the brick work located in the two chambers. The furnace is operated in this manner for a period of approximately ten to fifteen minutes when suitable control valves are operated to effect reversal of use of the chambers and pockets at the opposite ends of the furnace. By this method of operation, the brick work in the checker chambers at one end of the furnace is being heated by the products of combustion coming from the hearth while the incoming air and by-product gas flowing through the remaining checker chambers at the opposite end of the furnace are being heated by the heat retained in the brick work in these chambers from the preceding period of operation when these checker chambers were being heated by the discharging products of combustion.

After the precipitated slag or cinders accumulate in the pockets to a certain level, the furnace must be shut down to permit these deposits to be removed. The method embodying this invention deals with the problem of removing the slag or cinder deposits from the pockets in a much easier manner and shorter length of time than the deposits can be removed by the methods now conventionally practiced.

Figs. 1, 2 and 3 disclose a cinder pocket 8 with the precipitated slag or cinders accumulated to a level where the furnace must be shut down. Prior to placing the furnace in operation, it is best to cover certain portions of certain of the brick walls of the pockets with a false wall or lining. It is not absolutely necessary that the pockets be lined, nor is it necessary to cover all of the walls of the pockets. For example, it is entirely unnecessary to cover the walls provided with the openings 9 and 10 that lead to the checker chambers and the walls through which entrance to the pockets is obtained, either by a means of doors or by tearing away portions of the pocket walls. Entrance is usually obtained through the wall which is arranged diametrically opposite the entrances to the checker chambers. This false wall or lining may be of any desired construction, just so it may be readily removed, after the furnace is shut down, to provide space for the deposited material to expand or spread when it is broken up by a subsequent step in my method, which will be described in detail at a later point. The preferred construction for this false wall or lining is a temporary brick wall built in spaced relation to the permanent walls of the furnace with sand deposited in the space between the false walls and the permanent walls. This construction may be very quickly and easily removed after the furnace is shut down and entrance is had to the pockets. Figs. 1, 2 and 3 illustrate the false wall or lining 14 as covering the opposite sides and the bottom of a slag or cinder pocket 8. Fig. 4 illustrates the pocket 8 after the false wall or lining 14 has been removed from between the deposited slag or cinders 15 and the side walls of the pocket. As the lining beneath the deposited mass 15 is not accessible, it is not removed.

When the furnace is first shut down, the accumulated slag or cinders in the pockets 8 are in a more or less molten state. After an entrance is made into both of the pockets, water is sprayed thereinto for the purpose of quickly reducing the temperature in the pockets and solidifying the deposited slag or cinders. As soon as the temperature in the pockets is lowered sufficiently, workmen in insulated clothing enter the pockets for the purpose of cleaning out the deposits.

It is, at best, a difficult job to break up the solidified deposits and remove the same from the pockets. In practicing my method, I am able to very quickly reduce the solidified deposits to chunks of proper size to permit them to be quickly and easily removed from the pockets. I effect this reduction of the solidified mass by forming therein one or more drill holes 17 which may extend at any desired angle from the top surface of the same.

Into the drill hole or drill holes, indestructible cartridges 18 are inserted. The type of indestructible cartridge I prefer to employ is completely illustrated and described in Patent No. 1,941,196, issued to Frank H. Armstrong, on December 26, 1933. Reference may be made to this issued patent for a complete understanding of this cartridge. Briefly described, it consists of a chambered main body which is provided at one end with a discharge cap having formed therein a plurality of discharge ports. The remaining end of the chambered body is suitably closed by a charging cap. At the discharge end of the chambered body, a rupturable wall is provided which gives way or ruptures upon the development of a predetermined pressure within the chamber. The material breaking pressure is provided by charging the chamber of the main body with liquid carbon dioxide at a pressure of approximately 1,000 pounds per square inch. To effect release of the material breaking medium from the cartridge at a predetermined work performing pressure, the liquid carbon dioxide is quickly gasified by means of a chemical heater unit which is electrically ignited. Burning of this chemical heater composition effects gasification of the liquid carbon dioxide. The aforementioned rupturable wall yields or blows out at the desired predetermined pressure and the highly compressed carbon dioxide gas is liberated through the discharge ports into the veins, crevices or cracks of the slag or cinder deposit. Expansion of this carbon dioxide gas effectively shatters or breaks up the deposit into chunks of a size which may be handled readily for removal from the pockets.

If the discharge ports are obliquely arranged, as is shown in Fig. 2 of Patent No. 2,083,976, issued to Frank H. Armstrong, on June 15, 1937, the cartridges 18 need not be tamped in the drill holes. These obliquely arranged discharge ports prevent building up of pressure between the lower end of the cartridge and the inner end of the drill hole, and result in holding the cartridge within the drill hole.

It has been determined that the best results are obtained by drilling the holes to a depth at least equal to two-thirds of the depth of the slag or cinder deposit. Best results are obtained when the bottom end of each drill hole is located approximately one foot from the floor of the pocket.

Fig. 5 illustrates the appearance of the slag deposit after it is broken up by the charges from the cartridges 18. The cartridges, of course, are loose within the broken up material and may be recovered for future use as the slag is removed from the pockets.

It will be appreciated that when the solidified slag or cinder is broken up by the charges from the cartridges, the temperature of the deposit still is extremely high. For the purpose of effecting cooling of the cartridges while they are positioned within the drill holes 17, I may fill the said drill holes with a suitable cooling medium, such as water. This cooling medium 19 is illustrated in the drill holes 17 disclosed in Fig. 4. The diameter of the drill holes relative to the diameter of the cartridges has been magnified in this figure to enable the cooling medium 19 to be clearly illustrated.

The advantages to be derived from the use of my method may be set forth as follows:

(1) Speeding up the cycle of cleaning out the cinder or slag pockets which result in:

(a) A direct labor saving, reducing to approximately twenty-four hours the work which heretofore has taken from sixty to eighty hours.

(b) A material monetary saving by reducing the non-productive cleaning out period of the furnace.

(2) A safe method of dislodging the deposits within the pockets which is suitable for use in plants located within city limits normally not allowing explosives to be employed.

(3) No fumes to delay clearing out of material after successive shots are fired.

(4) The released, highly compressed carbon dioxide gas effects a slow heaving action which is not harmful to the permanent walls of the furnaces and results in no concussion which would damage said walls.

(5) The addition of a cooling medium, such as water, to the drill holes and in and around the cartridges, tends to cool the mass of slag or cinders and produces minute cracks, due to contraction effects, to give the shell an hydraulic action when the gaseous charge is released, and keeps the cartridge or shell at a reasonable temperature before firing.

(6) The cartridges may be employed either with or without the use of a cooling medium and with the drill holes arranged at any desired angle relative to the top of the mass.

I have described above the preferred steps, and certain modifications thereof, which may be employed in carrying out this method of quickly and easily effecting removal of the slag and cinder deposits from pockets designed to receive the same. It is to be understood, however, that I do not desire to be limited to the exact steps as they have been disclosed, for variations and modifications of the same falling within the accompanying claims are contemplated. I further do not intend to limit the application of my invention to any particular open hearth heating furnace structure because of my illustration of one accepted form of the same.

Having thus described my invention, I claim:

1. The method of cleaning out deposits in slag or cinder pockets of open hearth heating furnaces which comprises the steps of confining in a container a charge of highly compressed gas, and suddenly liberating said gas into a depression formed in the mass of solidified slag or cinders, whereby expansion of the gas will reduce the mass to chunks of a size which may be readily removed from the pockets.

2. The method of cleaning out deposits in slag or cinder pockets of open hearth heating furnaces which comprises the steps of confining in a container a charge of non-gaseous carbon dioxide, raising the temperature of the charge to and above the critical temperature of the same to create within said container a charge of highly compressed carbon dioxide gas at a predetermined pressure capable of breaking up the deposits, and releasing said gaseous charge into a depression formed in said deposit when said predetermined pressure has been reached.

3. The method of cleaning out deposits in slag or cinder pockets of open hearth heating furnaces which comprises the steps of forming in said deposit a drill hole, depositing in said drill hole a cooling medium, inserting in said drill hole in heat exchange relation to said cooling medium a container in which is confined a charge of highly compressed gas, and suddenly liberating said gas into said drill hole, whereby expansion of the gas will reduce the mass to chunks of a size which may be readily removed from the pockets.

4. The method of cleaning out deposits in slag or cinder pockets of open hearth heating furnaces which comprises the steps of forming in said deposit a drill hole, depositing in said drill hole a cooling medium, inserting in said drill hole in heat exchange relation to said cooling medium a container in which is confined a charge of non-gaseous carbon dioxide, raising the temperature of the charge to and above the critical temperature of the same to create within said container a highly compressed carbon dioxide gas at a predetermined pressure capable of breaking up the deposit, and releasing said highly compressed gas into the drill hole, whereby expansion of the gas will reduce the mass to chunks of a size which may be readily removed from the pockets.

5. The method of cleaning out deposits in slag or cinder pockets of open hearth heating furnaces which comprises the steps of confining in a container a charge of highly compressed gas, forming in said deposit a drill hole, placing in said drill hole a charge of water, inserting the container in the drill hole in heat exchange relation to said water, and suddenly liberating said gas into the drill hole, whereby expansion of the gas reduces the mass to chunks of a size which may be readily removed from the pockets.

6. The method of cleaning out deposits in slag or cinder pockets of open hearth heating furnaces which comprises the steps of forming in said deposit a drill hole, depositing in said drill hole a cooling medium in the form of water, inserting in said drill hole in heat exchange relation to said water a container in which is confined a charge of non-gaseous carbon dioxide, raising the temperature of the charge to and above the critical temperature of the same to create within said container a charge of highly compressed carbon dioxide gas at a predetermined pressure capable of breaking up the deposit, and releasing said gaseous charge into the drill hole when said predetermined pressure has been reached.

7. The method of cleaning out deposits in slag or cinder pockets of open hearth heating furnaces which comprises the steps of forming expansion spaces between the deposit and certain of the permanent walls of the pocket, confining in a container a charge of highly compressed gas, and suddenly liberating said gas into a depression formed in the mass of solidified slag or cinders, whereby expansion of the gas will result in breaking up the mass and spreading the same horizontally to fill said expansion spaces.

8. The method of cleaning out deposits in slag or cinder pockets of open hearth heating furnaces which comprises the steps of forming expansion spaces between the deposit and certain of the permanent walls of the pocket, confining in a container a charge of non-gaseous carbon dioxide, raising the temperature of the charge to and above the critical temperature of the same to create within said container a charge of highly compressed carbon dioxide gas at a predetermined pressure capable of breaking up the deposit, and releasing said gaseous charge into a depression formed in said deposit when said predetermined pressure has been reached, said gaseous charge being permitted to break up the mass without injuring the permanent walls of the pocket due to the provision of the expansion spaces.

9. The method of cleaning out deposits in slag or cinder pockets of open hearth heating furnaces which comprises the steps of forming expansion spaces between the deposit and certain of the permanent walls of the pocket by the removal of temporary false walls associated with said permanent walls prior to permitting the deposit to accumulate in said pocket, confining in a container a charge of highly compressed gas, and suddenly liberating said gas into a depression formed in the mass of solidified slag or cinders, whereby expansion of the gas will reduce the mass to chunks of a size which may be readily removed from the pocket.

10. The method of cleaning out deposits in slag or cinder pockets of open hearth heating furnaces which comprises reducing the deposit to chunks of a size which may be readily removed from the pocket by the application of the forces of expanding highly compressed gas in the veins and crevices of the deposit.

11. The method of cleaning out deposits in slag or cinder pockets of open hearth heating furnaces which comprises the steps of confining in a container a charge of highly compressed gas, and suddenly liberating said gas in the veins and crevices of the mass of solidified slag or cinders at a depth in excess of one-half the depth of the deposit, whereby expansion of the gas will reduce the mass to chunks of a size which may be readily removed from the pocket.

12. The method of cleaning out deposits in slag or cinder pockets of open hearth heating furnaces which comprises the steps of confining in a container a charge of non-gaseous carbon dioxide, raising the temperature of the charge to and above the critical temperature of the same to create within said container a charge of highly compressed carbon dioxide gas at a predetermined pressure capable of breaking up the deposits, and suddenly releasing said gas in the veins and crevices of the mass of solidified slag or cinders at a point relative to the depth of the mass which is in excess of one-half the depth of the deposit, whereby expansion of the gas will reduce the mass to chunks of a size which may be readily removed from the pocket.

13. The method of cleaning out deposits in slag or cinder pockets of open hearth heating furnaces which comprises the steps of forming in the mass of solidified slag or cinders one or more substantially perpendicularly arranged drill holes which terminate at a depth in excess of one-half the depth of the deposit, and suddenly liberating substantially at the inner terminal of said drill hole a charge of highly compressed gas whereby expansion of the gas will reduce the mass to chunks of a size which may be readily removed from the pockets.

14. The method of cleaning out deposits in slag or cinder pockets of open hearth heating furnaces which comprises the steps of confining in a container a charge of highly compressed gas, forming expansion spaces between the deposit and certain of the permanent walls of the pocket, forming in said deposit a drill hole, depositing in said drill hole a cooling medium, inserting in said drill hole in heat exchange relation to said cooling medium the container in which is confined the charge of highly compressed gas, and suddenly liberating said gas into said drill hole, whereby expansion of the gas will release the mass to chunks of a size which may be readily removed from the pocket.

15. The method of cleaning out deposits in slag or cinder pockets of open hearth heating furnaces which comprises the steps of forming expansion spaces between the deposit and certain of the permanent walls of the pocket, forming in said deposit a drill hole, depositing in said drill hole a cooling medium, inserting in said drill hole in heat exchange relation to said cooling medium a container in which is confined a charge of non-gaseous carbon dioxide, raising the temperature of the charge to and above the critical temperature of the same to create within said container a highly compressed carbon dioxide gas at a predetermined pressure capable of breaking up the deposit, and releasing said highly compressed gas into the drill hole, whereby expansion of the gas will reduce the mass to chunks of a size which may be readily removed from the pocket.

16. The method of cleaning out deposits in slag or cinder pockets of open hearth heating furnaces which comprises the steps of confining in a container a charge of highly compressed gas, forming in said deposit a drill hole, forming expansion spaces between the deposit and certain of the permanent walls of the pocket, placing in said drill hole a charge of water, and inserting the container in the drill hole in heat exchange relation to said water, and suddenly liberating said gas into the drill hole, whereby expansion of the gas reduces the mass to chunks of a size which may be readily removed from the pocket.

17. The method of cleaning out deposits in slag or cinder pockets of open hearth heating furnaces which comprises the steps of forming expansion spaces between the deposit and certain of the permanent walls of the pocket, forming in said deposit a drill hole, depositing in said drill hole a cooling medium in the form of water, inserting in said drill hole in heat exchange relation to said water a container in which is confined a charge of non-gaseous carbon dioxide, raising the temperature of the charge to and above the critical temperature of the same to create within said container a charge of highly compressed carbon dioxide gas at a predetermined pressure capable of breaking up the deposit, and releasing said gaseous charge into the drill hole when said predetermined pressure has been reached.

18. The method of cleaning out deposits in slag or cinder pockets of open hearth heating furnaces which comprises the steps of forming expansion spaces between the deposit and certain of the permanent walls of the pocket by the removal of temporary false walls associated with permanent walls prior to permitting the deposit to accumulate in said pocket, forming in said deposit a drill hole, depositing in said drill hole a cooling medium, inserting in said drill hole in heat exchange relation to said cooling medium a container in which is confined a charge of highly compressed gas, and suddenly liberating said gas into said drill hole, whereby expansion of the gas will reduce the mass to chunks of a size which may be readily removed from the pockets.

19. The method of cleaning out deposits in slag or cinder pockets of open hearth heating furnaces which comprises reducing the deposit to chunks of a size which may be readily removed from the pocket by the application of the forces of highly compressed gas which is expanded in a manner to effect horizontal spreading of the deposit in a plurality of directions.

20. The method of cleaning out deposits in slag or cinder pockets of open hearth heating furnaces which comprises the steps of forming one or more expansion spaces between the deposit and the permanent walls of the pocket, forming one or more drill holes in the deposit, and applying fluid pressure to the walls of the drill hole or holes in the proper directions to cause the deposit to spread into said expansion spaces and thereby be broken into chunks of a size which may be readily removed from the pockets.

21. The method of cleaning out deposits in slag or cinder pockets of open hearth heating furnaces which comprises the steps of forming one or more expansion spaces between the deposit and the permanent walls of the pocket, forming one or more drill holes in the deposit, and applying the expanding forces of highly compressed gas to the walls of the drill hole or holes in the proper direction to cause the deposit to spread into said expansion spaces and thereby be broken into chunks of a size which may be readily removed from the pockets.

WILLIAM CURRAN CAVANAGH.